United States Patent [19]
Kato et al.

[11] Patent Number: 5,689,952
[45] Date of Patent: Nov. 25, 1997

[54] EXHAUST GAS-PURIFYING SYSTEM FOR INTERNAL COMBUSTION ENGINES

[75] Inventors: Hiroaki Kato; Takashi Komatsuda; Yuichi Shimasaki; Akihisa Saito; Tetsu Teshirogi; Takuya Aoki; Hideo Furumoto, all of Wako; Takayoshi Nakayama, Haga-gun, all of Japan

[73] Assignee: Honda Giken Kogyo K.K., Tokyo, Japan

[21] Appl. No.: 634,466

[22] Filed: Apr. 18, 1996

[30] Foreign Application Priority Data

Apr. 21, 1995 [JP] Japan ..................... 7-120649

[51] Int. Cl.⁶ ............................................ F01N 9/00
[52] U.S. Cl. ........................ 60/277; 60/284; 60/286; 60/300
[58] Field of Search ........................... 60/277, 284, 286, 60/300

[56] References Cited

U.S. PATENT DOCUMENTS

| | | | |
|---|---|---|---|
| 5,191,763 | 3/1993 | Yuuki | 60/300 |
| 5,390,493 | 2/1995 | Fujishita et al. | 60/300 |
| 5,404,720 | 4/1995 | Laing | 60/300 |
| 5,503,804 | 4/1996 | Fujishita et al. | 60/300 |
| 5,539,286 | 7/1996 | Brinkmeyer et al. | 60/300 |

FOREIGN PATENT DOCUMENTS 4-279718  10/1992  Japan.

*Primary Examiner*—Sheldon Richter
*Attorney, Agent, or Firm*—Arthur L. Lessler

[57] ABSTRACT

An exhaust gas-purifying system for an internal combustion engine includes an alternator driven by the engine. A regulator controls voltage generated by the alternator. An electrically-heated catalyzer is arranged in the exhaust system of the engine and connected to the alternator to be electrically heated by electric power generated by the alternator. An ECU controls the regulator to control the voltage generated by the alternator and supplied to the electrically-heated catalyzer, according to a degree of aging of the electrically-heated catalyzer.

8 Claims, 10 Drawing Sheets

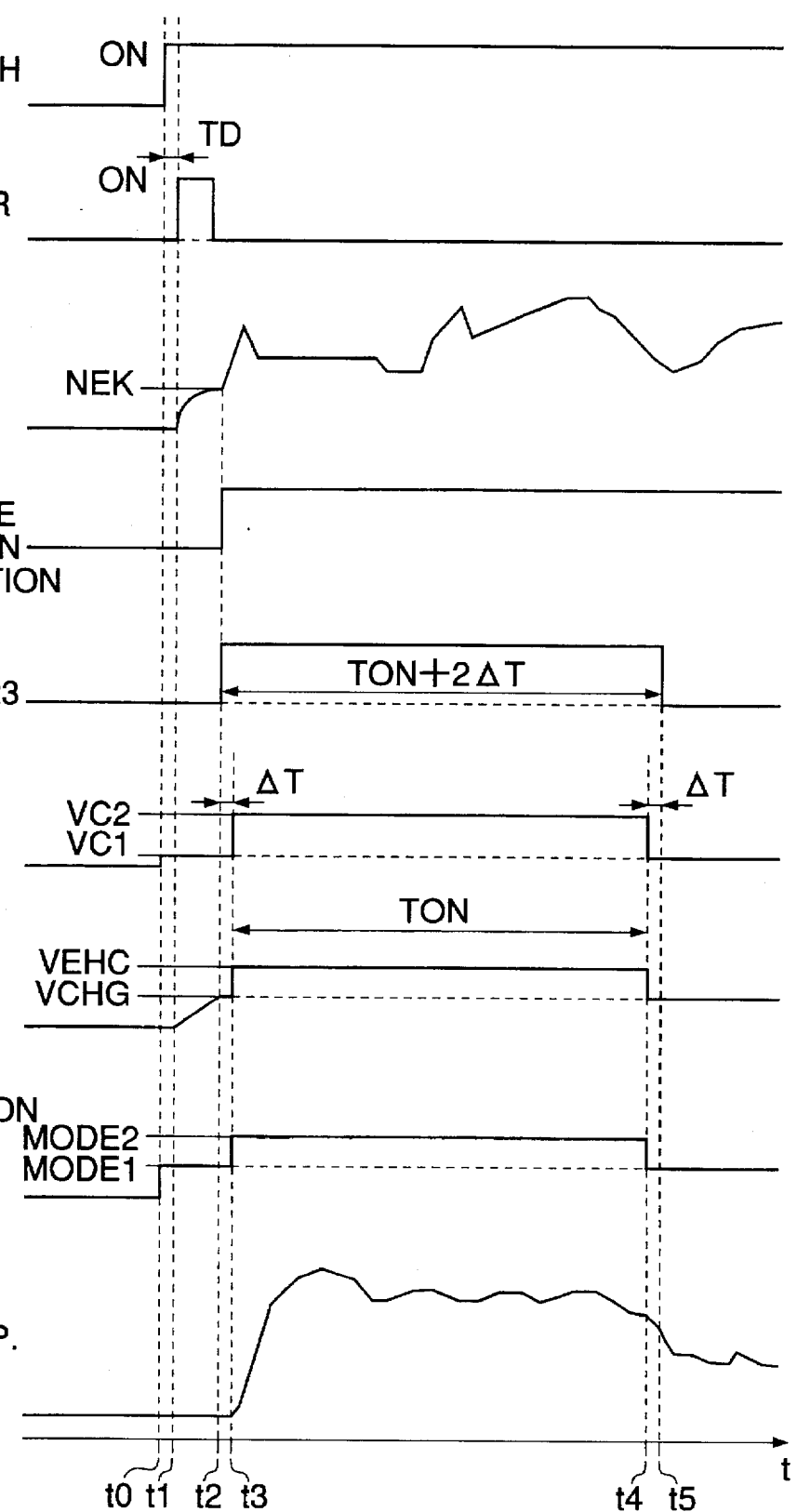

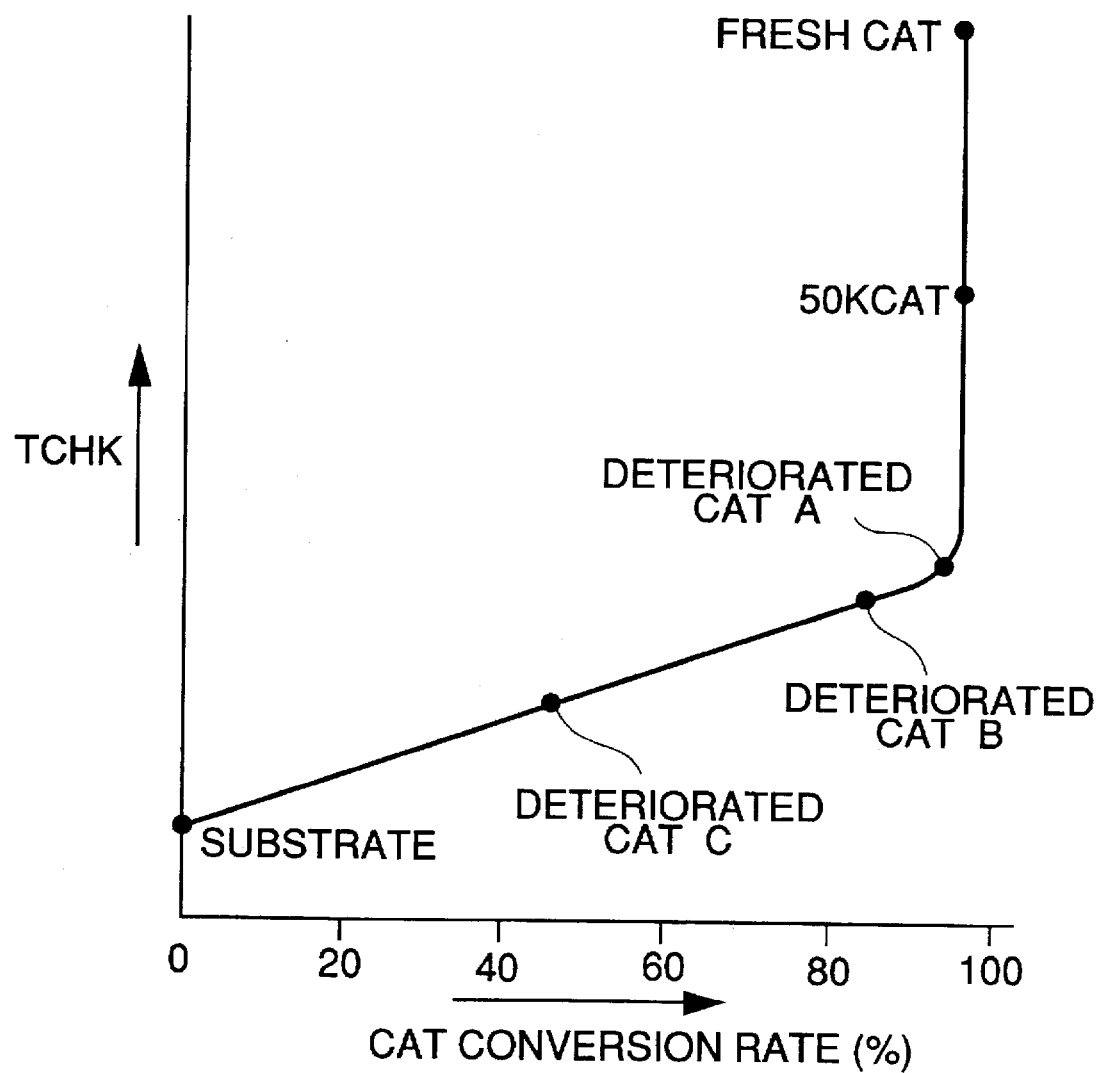

EXHAUST GAS-PURIFYING SYSTEM FOR INTERNAL COMBUSTION ENGINES

BACKGROUND OF THE INVENTION

1. Field of the Invention

This invention relates to an exhaust gas-purifying system for internal combustion engines, and more particularly to an exhaust gas-purifying system of this kind which has an electrically-heated catalyzer.

2. Prior Art

A catalyzer employed in an internal combustion engine for purifying exhaust gases emitted from the engine does not become activated until a considerable time period elapses after the start of the engine when the engine is started in a cold state. To accelerate the activation of the catalyzer, there is conventionally known an electrically-heated catalyzer which is electrically heated to become promptly activated.

A method of controlling energization of such an electrically-heated catalyzer is conventionally known, for example, from Japanese Laid-Open Patent Publication (Kokai) No. 4-279718, which sets an energization time period according to a detected engine temperature or a like parameter, and causes electric power to be supplied from a battery to the catalyzer over the set energization time period to increase the catalyzer temperature to a desired value.

When a catalyzer has its characteristic deteriorated due to aging, the catalyzer tends to require heating to a higher temperature to become activated. Therefore, the energization of the catalyzer should be controlled by changing the desired temperature required for activation of the catalyzer according to the degree of aging of the catalyzer.

However, the above conventionally known method can only control the energization time period over which the catalyzer is supplied with electric power from the battery. When a catalyzer with a small heat capacity which is recently diffused is controlled by the above conventional method, the following problem arises: That is, while the temperature of a catalyzer with a relatively large capacity can be controlled to a desired value only by controlling the energization time period, the catalyzer with a small heat capacity tends to sharply rise in temperature when it is energized. Therefore, it is difficult to accurately control the temperature of the catalyzer with a small heat capacity to a desired value, only by controlling the energization time period. As a result, when the catalyzer is a fresh one, it rises in temperature to an excessive degree, resulting in degraded durability thereof or a mechanical damage to a catalyst carrier of the catalyzer. To eliminate this inconvenience of the catalyzer when it is fresh, if the energization of the catalyzer is controlled so as to elevate the catalyzer temperature at a slow rate, the catalyzer temperature rises too slowly when the catalyzer is aged, which incurs degraded exhaust emission characteristics of the engine immediately after the start of the engine.

SUMMARY OF THE INVENTION

It is the object of the invention to provide an exhaust gas-purifying system for internal combustion engines, which is capable of accurately controlling the temperature of the electrically-heated catalyzer according to the degree of aging thereof, so as to prevent excessive rise of the temperature of the catalyzer when it is fresh as well as degradation of exhaust emission characteristics of the engine when the catalyzer is aged.

To attain the above object, the present invention provides an exhaust gas-purifying system for an internal combustion engine having an exhaust system, comprising:

an alternator driven by the engine, for generating electric power;

regulator means for controlling voltage generated by the alternator;

an electrically-heated catalyzer arranged in the exhaust system of the engine, the catalyzer being connected to the alternator to be electrically heated by the electric power generated by the alternator;

aging degree-detecting means for detecting a degree of aging of the electrically-heated catalyzer; and regulator control means for controlling the regulator means to control the voltage generated by the alternator and supplied to the electrically-heated catalyzer, according to the degree of aging of the electrically-heated catalyzer detected by the aging degree-detecting means.

Preferably, the aging degree-detecting means detects a value of a parameter representative of an oxygen storage capacity of the electrically-heated catalyzer, the regulator control means controlling the voltage generated by the alternator and supplied to the electrically-heated catalyzer according to the value of the parameter detected by the aging degree-detecting means.

More preferably, the exhaust gas-purifying system includes oxygen concentration-detecting means arranged in the exhaust gas of the engine downstream of the electrically-heated catalyzer, for detecting concentration of oxygen in exhaust gases from the engine, and the aging degree-detecting means detects an inversion time period of an output from the oxygen concentration-detecting means as the value of the parameter representative of the oxygen storage capacity of the electrically-heated catalyzer.

Alternatively, the aging degree-detecting means detects the degree of aging of the electrically-heated catalyzer, based on a traveling distance of an automotive vehicle in which the engine is installed.

Also alternatively, the aging degree-detecting means detects the degree of aging of the electrically-heated catalyzer, based on a number of times of energization of the electrically-heated catalyzer after start of use thereof.

Further preferably, the exhaust gas-purifying system includes operating condition-detecting means for detecting operating conditions of the engine, and the regulator control means according to the operating conditions of the engine detected by the operating conditions of the engine as well as the degree of aging of the electrically-heated catalyzer detected by the aging degree-detecting means.

Preferably, the regulator control means further controls a time period over which the voltage generated by the alternator is supplied to the electrically-heated catalyzer, according to the operating conditions of the engine detected by the operating condition-detecting means.

More preferably, wherein the operating condition-detecting means detects at least one of temperature of the engine, temperature of intake air supplied to the engine, and temperature of the exhaust system.

The above and other objects, features, and advantages of the invention will be more apparent from he following detailed description taken in conjunction with the accompanying drawings.

BRIEF DESCRIPTION OF THE DRAWINGS

FIGS. 7A to 7I collectively form a timing chart showing the relationship between operations of essential component parts and changes in control parameters, wherein FIG. 7A shows the operation of an IG switch of the engine;

FIG. 7B shows the operation of a starter of the engine;

FIG. 7C shows changes in engine rotational speed NE;

FIG. 7D shows a signal indicative of a determination as to complete explosion of the engine;

FIG. 7E shows a changeover control signal for a switch appearing in FIG. 2;

FIG. 7F shows a change in voltage VC supplied to a regulator appearing in FIG. 2;

FIG. 7G shows a change in output voltage VALT from an alternator appearing in FIG. 2;

FIG. 7H shows a change in generation mode of the alternator; and

FIG. 7I shows changes in the temperature of the electrically-heated catalyzer;

FIGS. 9A and 9B collectively form a timing chart useful in explaining a manner of calculating a parameter TCHK representative of the deterioration degree of the catalyst, wherein FIG. 9A shows a change in an air-fuel ratio correction coefficient KO2; and FIG. 9B shows a change in output from a downstream oxygen concentration sensor; and FIG. 10 shows a graph showing the relationship between the purification rate of the catalyzer and the parameter TCHK.

DETAILED DESCRIPTION

The invention will now be described in detail with reference to the drawings showing an embodiment thereof.

Figure 1:
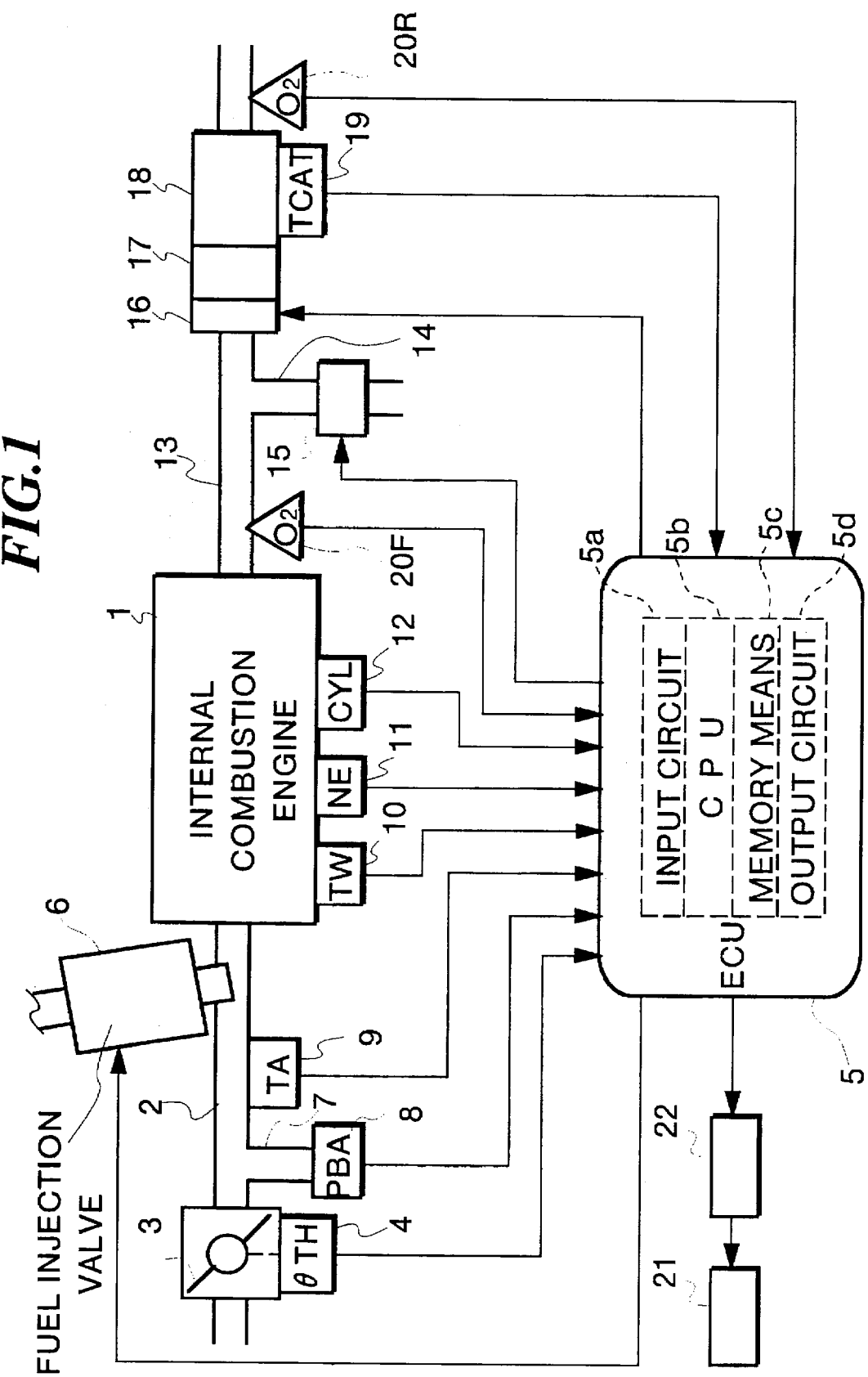
FIG. 1 is a block diagram schematically showing the whole arrangement of an internal combustion engine and an exhaust gas-purifying system therefor, according to an embodiment of the invention.

Referring first to FIG. 1, there is illustrated the whole arrangement of an internal combustion engine and an exhaust gas-purifying system therefor, according to an embodiment of the invention. In the figure, reference numeral 1 designates an internal combustion engine (hereinafter referred to as "the engine"), which has an intake pipe 2 connected to the cylinder block of the engine 1, in which is arranged a throttle valve 3. A throttle valve opening ($\theta$TH) sensor 4 is connected to the throttle valve 3, for generating an electric signal indicative of the sensed throttle valve opening $\theta$TH to an electronic control unit (hereinafter referred to as "the ECU") 5.

Fuel injection valves 6, only one of which is shown, are each provided for each cylinder and arranged in the intake pipe 2 at a location intermediate between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is connected via a conduit 7 to the intake pipe 2 at a location immediately downstream of the throttle valve 3, for sensing absolute pressure PBA within the intake pipe 2, and is electrically connected to the ECU 5, for supplying an electric signal indicative of the sensed absolute pressure PBA to the ECU 5. Further, an intake air temperature sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1, which is filled with coolant, for supplying an electric signal indicative of the sensed engine coolant temperature TW to the ECU 5.

An engine rotational speed (NE) sensor 11 and a cylinder-discriminating (CYL) sensor 12 are arranged in facing relation to a camshaft or a crankshaft of the engine 1, neither of which is shown. The NE sensor 11 generates a signal pulse (hereinafter referred to as "a TDC signal pulse") at each of predetermined crank angles (e.g. whenever the crankshaft rotates through 180 degrees when the engine is of a 4-cylinder type) which each correspond to a predetermined crank angle before a top dead point (TDC) of each cylinder corresponding to the start of the suction stroke of the cylinder, while the CYL sensor 12 generates a signal pulse at a predetermined crank angle of a particular cylinder of the engine, both of the pulses being supplied to the ECU 5.

An upstream oxygen concentration sensor (hereinafter referred to as "the upstream O2 sensor") 20F, an electrically-heated catalyzer (hereinafter referred to as "the EHC") 16, a starting catalyzer 17, a three-way catalyzer 18, and a downstream oxygen concentration sensor (hereinafter referred to as "the downstream O2 sensor") 20R are arranged in an exhaust pipe 13 connected to the engine 1 in this order from an upstream side thereof. The O2 sensors 20F and 20R detect the concentration of oxygen present in exhaust gases emitted from the engine, and supply signals indicative of the sensed oxygen concentration to the ECU 5. The catalyzers 16, 17 and 18 function to purify noxious components in exhaust gases from the engine, such HC, CO, and NOx. The starting catalyzer 17 is a small-sized catalyzer provided mainly for purifying exhaust gases immediately after the starting of the engine.

Extending from the exhaust pipe 13 is a passage 14 for supplying secondary air into the exhaust pipe 13 at a location upstream of the EHC 16, in which is arranged an air pump 15.

The EHC 16 and the air pump 15 are electrically connected to the ECU 5 to have their operations controlled by signals from the ECU 5. Further, a catalyst temperature sensor 19 is connected to the three-way catalyzer 18, for supplying an electric signal indicative of the sensed catalyzer temperature TCAT to the ECU 5.

Further, an alternator 21, which is driven by the engine 1, is connected to the engine 1 via a regulator 22 such that voltage generated by the alternator 21 is controlled by a signal from the ECU 5.

The ECU 5 is comprised of an input circuit 5a having the functions of shaping the waveforms of input signals from various sensors, shifting the voltage levels of sensor output signals to a predetermined level, converting analog signals from analog-output sensors to digital signals, and so fourth, a central processing unit (hereinafter referred to as "the CPU") 5b, memory means 5c storing various operational programs which are executed by the CPU 5b and for storing results of calculations therefrom, etc., and an output circuit 5d which delivers control signals to the fuel injection valves 6, air pump 15, EHC 16, regulator 22, etc., for driving the same.

The CPU 5b calculates fuel injection periods TOUT over which the fuel injection valves 6 are to be opened, in response to the various engine parameter signals from the above-mentioned sensors by the use of the following equation (1), and calculates an energization time period TON of the ECH 16 and voltage VEHC supplied thereto, as described hereinafter, to generate control signals to the fuel injection valves 6, the EHC 16, etc. based on results of the calculation:

$$TOUT = TI \times KO2 \times K1 + K2 \quad (1)$$

where TI represents a basic fuel amount, i.e. a basic value of the fuel injection period TOUT, which is determined according to the engine rotational speed NE and the intake pipe absolute pressure PBA. A TI map for determining the TI value is stored in the memory means 5c.

KO2 represents an air-fuel ratio correction coefficient which is determined based on outputs from the upstream and downstream O2 sensors 20F and 20R. The correction coefficient KO2 is calculated or set such that the air-fuel ratio detected by the upstream O2 sensor 20F becomes equal to a desired value when the engine 1 is operating in an air-fuel ratio feedback control region, while it is set to predetermined values corresponding to respective operating regions of the engine 1 when the engine 1 is in open-loop control regions.

K1 and K2 represent other correction coefficients and correction variables, respectively which are set according to engine operating parameters to such values as optimize engine operating characteristics, such as fuel consumption and engine accelerability.

Figure 2:
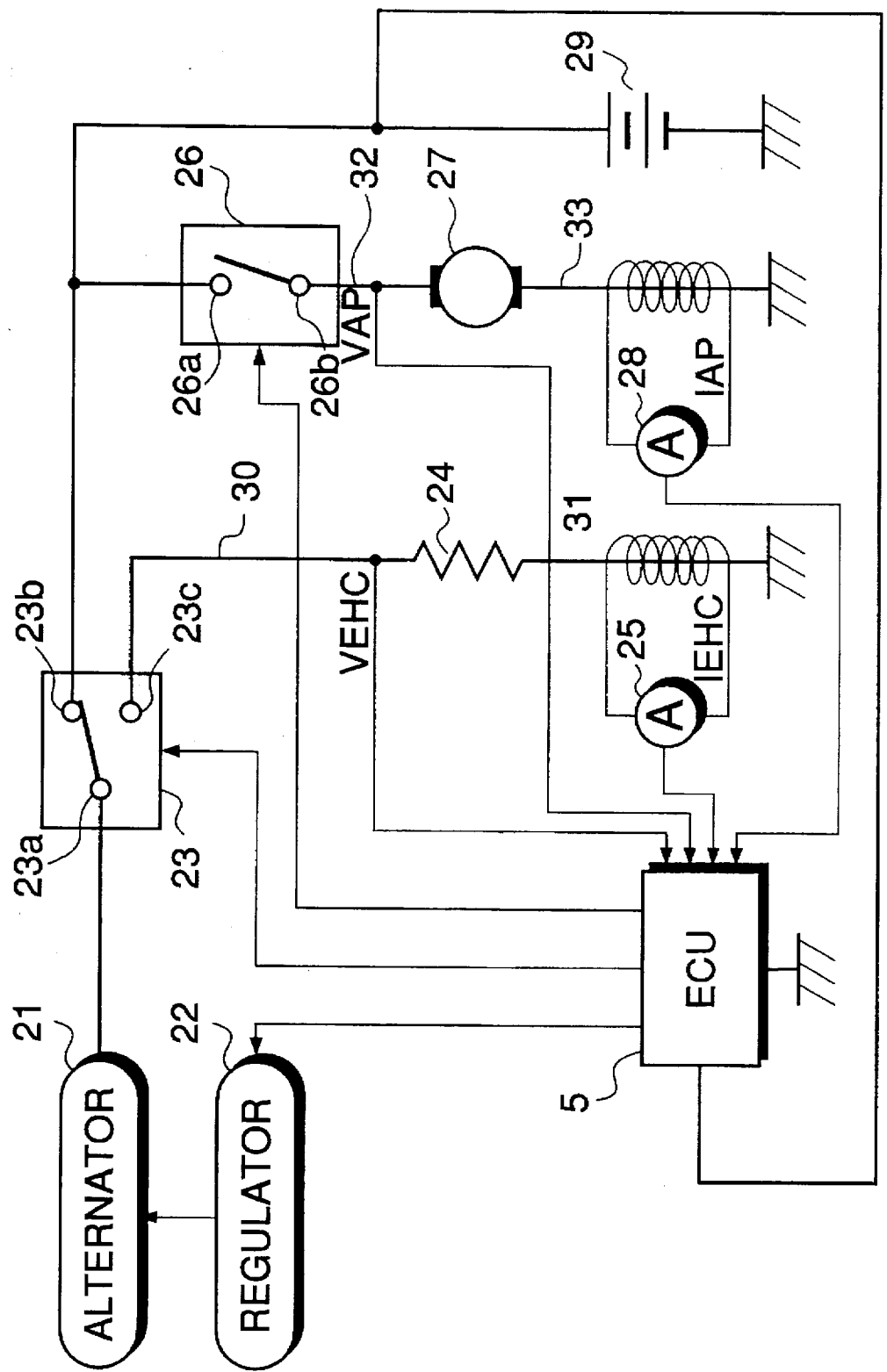
FIG. 2 is a circuit diagram showing the connection of a heater resistance of an electrically-heated catalyzer appearing in FIG. 2 and its related circuit parts.

FIG. 2 shows a circuit formed by the ECU 5, the alternator 21, the regulator 22, a heater resistance 24 of the EHC 16, a motor 27 of the air pump 15, and a battery 29 of the engine 1. The battery 29 supplies its output voltage as operating voltage to the ECU 5, electrical load devices, not shown, of the engine, etc. The ECH 16 employed in the present embodiment also acts as a heater, that is, it has a catalyst body thereof supplied with current to be heated thereby. The electrical resistance of the catalyst body is represented as the heater resistance 24.

The alternator 21 has an output thereof connected to a terminal 23a of a changeover switch 23 which has another terminal 23c connected to one end of the heater resistance 24 through a connecting line 30. The other end of the heater resistance 24 is grounded through a connecting line 31. An EHC electric current sensor 25 is provided on the connecting line 31 to detect heater current IEHC supplied to the EHC 16.

The changeover switch 23 has a further terminal 23b connected to a positive electrode of the battery 29 as well as to a terminal 26a of an ON/OFF switch 26 which has another terminal 26b connected to one end of a motor 27 through a connecting line 32. The other end of the motor 27 is grounded through a connecting line 33 on which is provided a pump current sensor 28 for detecting current IAP supplied to the air pump 15.

The battery 29 has its negative electrode grounded and its positive electrode connected to the ECU 5.

The switches 23 and 26 are electrically connected to the ECU 5 to have their switching operations controlled by signals from the ECU 5. The switches 23 and 26 are normally in positions shown in FIG. 2 in which the terminals 23a and 23b of the switch 23 are connected to each other while the switch 26 is open with its terminals 26a, 26b disconnected from each other. The switches 23, 26 are controlled to be changed in position from their respective illustrated positions immediately after the start of the engine 1, if required. Further, the connecting lines 30 and 32 are electrically connected to the ECU 5 so that the ECU 5 detects voltage VEHC applied to the EHC 16 and voltage VAP applied to the air pump 15. Also, the electric current sensors 25 and 28 are connected to the ECU 5, for supplying signals indicative of the respective detected electric current values to the ECU 5. These current sensors 25 and 28 are provided for detecting abnormalities in the circuit, such as a disconnection.

Figure 3:
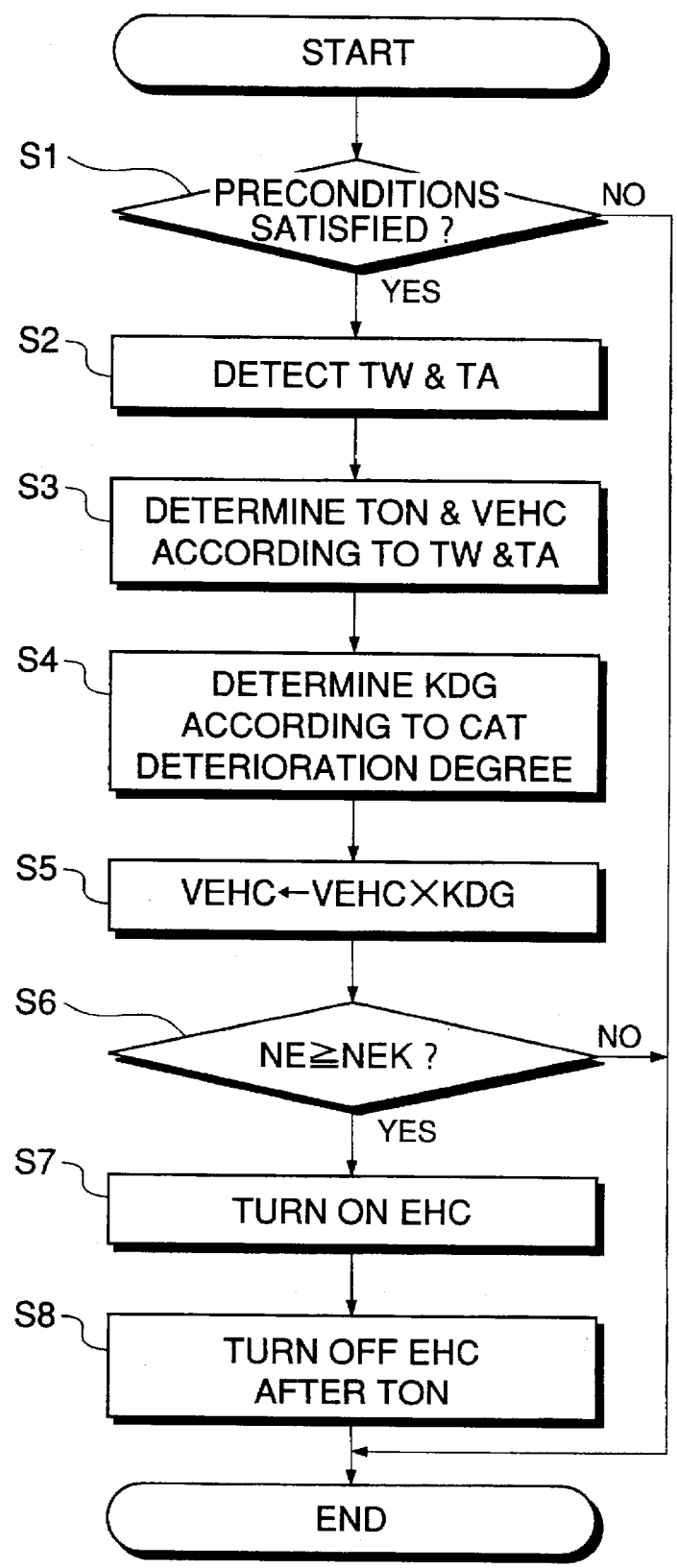
FIG. 3 is a flowchart showing a program for controlling voltage supplied to the electrically-heated and an energization time period of the same.

FIG. 3 shows a program for controlling supply of electric power to the heater resistance 24.

First, at a step S1, it is determined whether or not preconditions for carrying out the control of the electric power supply are satisfied, e.g. whether or not an ignition switch of the engine has been turned on. If the preconditions are not satisfied, the present routine is immediately terminated, whereas if the preconditions are satisfied, i.e. if the ignition switch has been turned on, detected values of the engine coolant temperature TW and the intake air temperature TA are read in at a step S2. Then, at a step S3, a TON map and a VEHC map which are set according to the TW and TA values are retrieved, to determine the energization time period (EHC-ON time period) TON of the heater resistance 24 and the voltage VEHC to be supplied to the EHC 16.

Figure 4A:
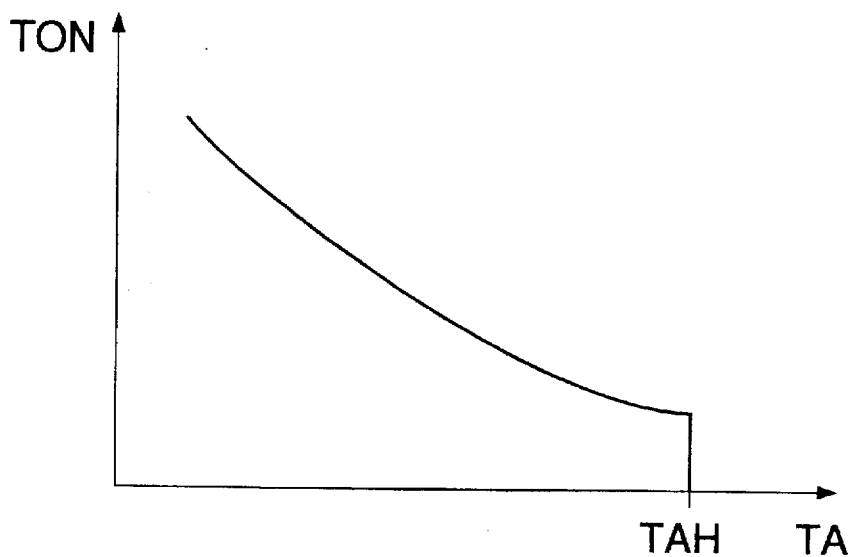
FIG. 4A is a graph showing the relationship between the energization time period TON of the catalyzer and intake air temperature TA.
Figure 4B:
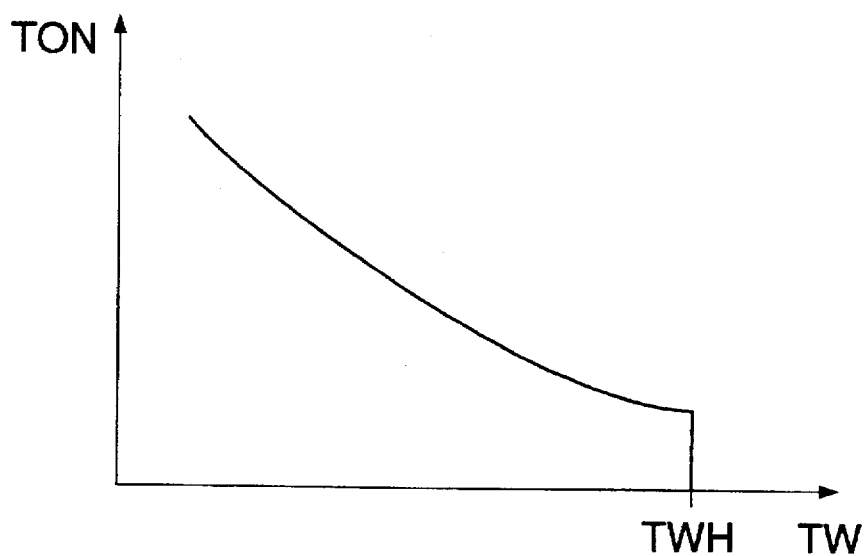
FIG. 4B is a graph showing the relationship between the TON value and engine coolant temperature TW.
Figure 5A:
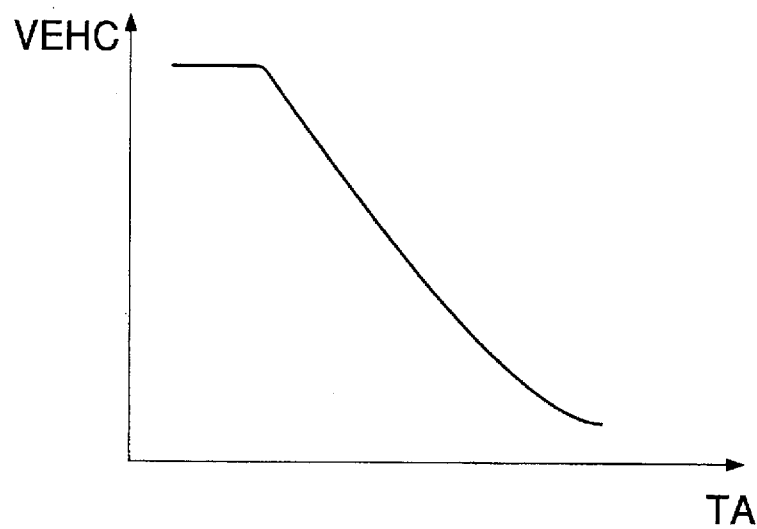
FIG. 5A is a graph showing the relationship between voltage VEHC supplied to the catalyzer and the intake air temperature TA.
Figure 5B:
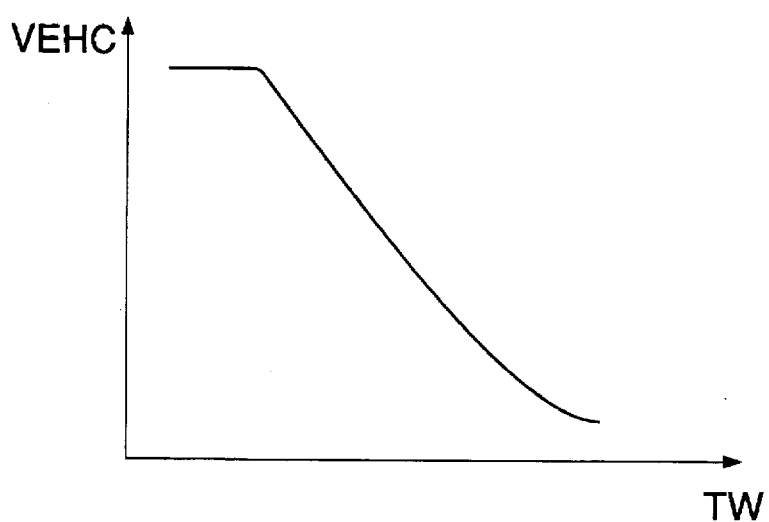
FIG. 5B is a graph showing the relationship between the VEHC value and the engine coolant temperature TW.
Figure 5C:
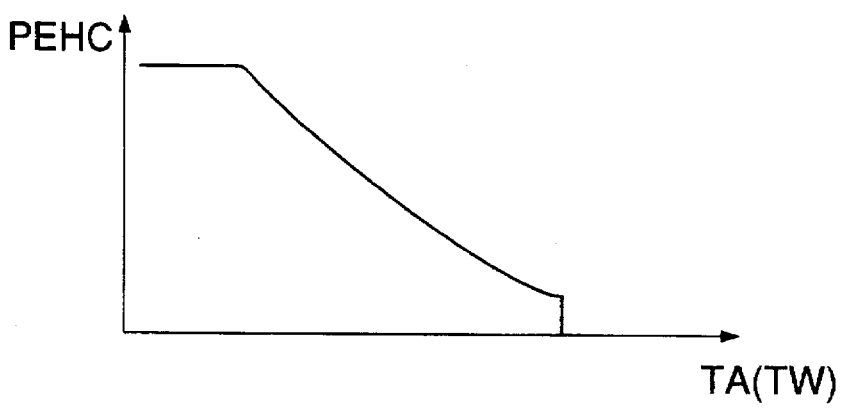
FIG. 5C is a graph showing the relationship between an amount of electric power PEHC supplied to the catalyzer and the intake air temperature TA or the engine coolant temperature TW.

The TON map is set based on the relationships shown in FIGS. 4A and 4B. More specifically, the TON value is decreased as the intake air temperature TA is higher, as shown in FIG. 4A, and as the engine coolant temperature TW is higher, as shown in FIG. 4B. When the intake air temperature TA and the engine coolant temperature TW exceed predetermined values TAH and TWH, respectively, energization of the heater resistance 24 is not carried out, and therefore the TON value is set to 0. The TON map contains map values empirically determined by the use of an equation of $TON = f_1(TA)(TW)$ based on the relationships shown in FIGS. 4A and 4B. The VEHC map is set based on the relationships shown in FIGS. 5A and 5B. More specifically, the VEHC value is decreased as the intake air temperature TA is higher, as shown in FIG. 5A, and the engine coolant temperature TA is higher, as shown in FIG. 5B. The VEHC map contains map values empirically determined by the use of an equation of $VEHC = f_2(TA)(TW)$ based on the relationship shown in FIGS. 5A and 5B. By thus controlling the VEHC value, electric power PEHC supplied to the EHC 16 is controlled as shown in FIG. 5C. Advantageously, the VEHC value is set to a value considerably higher than output voltage from the battery 29, e.g. to 30 volts when the engine is started in a cold state. By virtue of this setting, current supplied to the resistance 24 can be reduced to approximately a half of that supplied to the same from the battery 29.

Figure 6A:
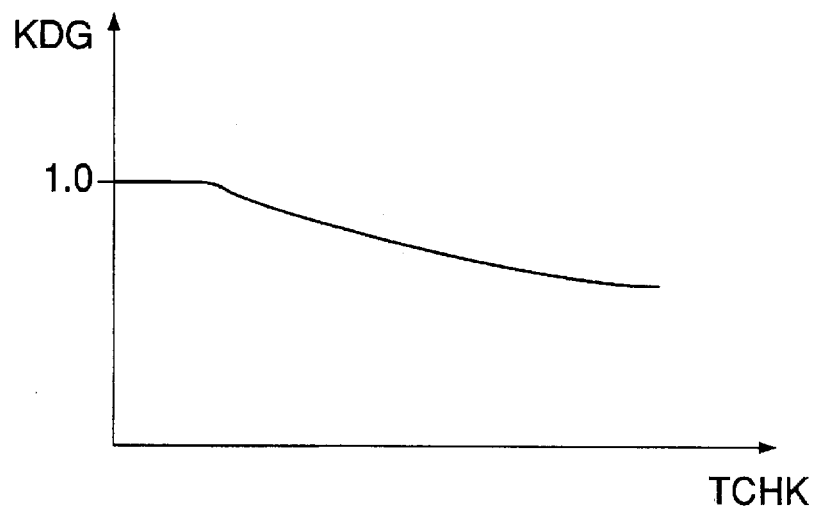
FIG. 6A shows a KDG-TCHK table for determining a deterioration-dependent correction coefficient KDG according to a parameter TCHK.

At the following step S4, a deterioration-dependent correction coefficient KDG is calculated by retrieving a KDG-TCHK table, shown in FIG. 6A, which is set according to a determination time period TCHK which is a parameter representative of the deterioration degree of the EHC 16 and detected in a manner described hereinafter. The determination time period TCHK is decreased as the EHC 16 is deteriorated to a larger degree, i.e. its oxygen storage capacity decreases by a larger amount. The KDG value is increased as the TCHK value is larger.

Figure 6B:
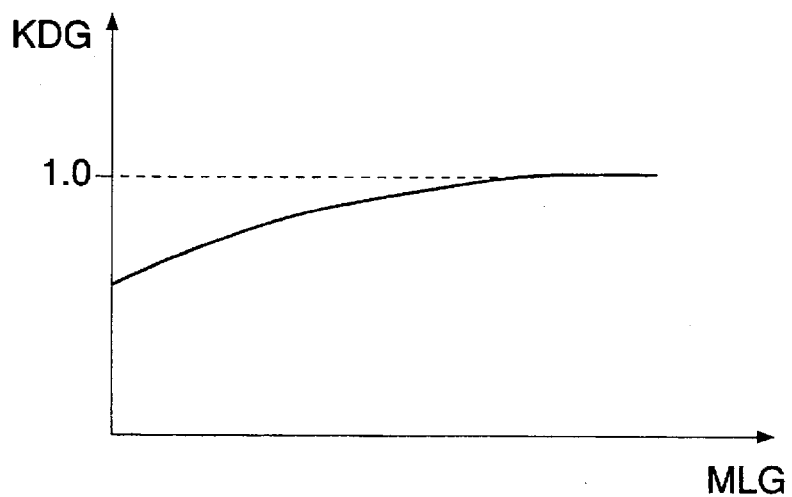
FIG. 6B shows a KDG-MLG table for determining the KDG value according to a parameter MLG.
Figure 6C:
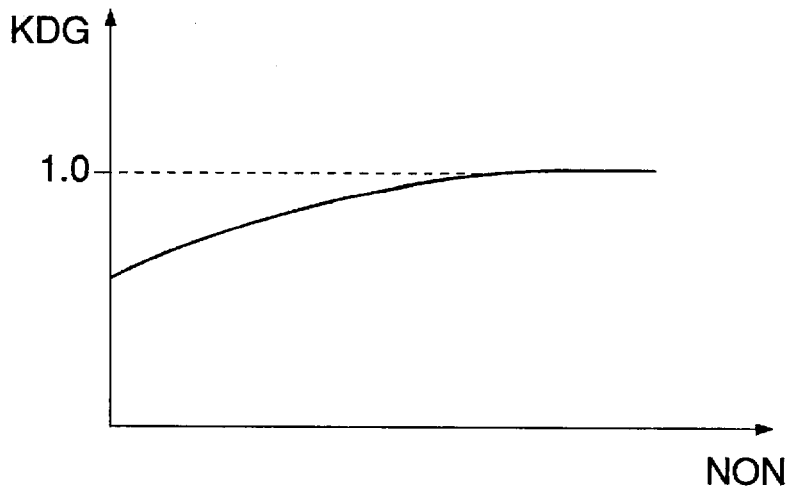
FIG. 6C shows a KDG-NON table for determining the KDG value according to a parameter NON.

Alternatively, the deterioration-dependent correction coefficient KDG may be determined by retrieving a KDG-MLG table, shown in FIG. 6B, which is set according to a traveling distance MLG of a vehicle in which the engine 1 is installed, or it may be determined by retrieving a KDG-NON table, shown in FIG. 6C, which is set according to a number of times of energization NON of the EHC 16 after the start of use of the same. The KDG-MLG table and the KDG-NON table are set such that the KDG value is increased as the MLG value or the NON value is larger. The maximum value of the KDG value is set at 1.0.

At a step S5, the EHC voltage VEHC is corrected by multiplying the VEHC value determined at the step S3 by the deterioration-dependent correction coefficient KDG calculated at the step S4. By virtue of this correction, when the catalyzer EHC 16 is fresh, the VEHC value is set to the minimum value, while it is set to a larger value as the deterioration of the EHC 16 advances. As a result, the EHC temperature can be accurately controlled according to the degree of aging of the EHC 16, thereby preventing excessive elevation of the temperature of the ECH 16 when it is fresh, while preventing degradation of exhaust emission characteristics of the engine when the EHC 16 is aged.

At the following step S6, it is determined whether or not the engine rotational speed NE is higher than a predetermined value NEK (e.g. 400 rpm) for determining whether or not complete explosion of the engine has taken place. If NE<NEK holds, the present routine is immediately terminated. On the other hand, if NE≧NEK holds, the program proceeds to a step S7, wherein the changeover switch 23 is switched to the terminal 23c side, and at the same time alternator output voltage VALT is controlled so as to be equal to the VEHC value determined at the step S5, whereby electric power having the thus controlled alternator output voltage VALT is supplied to the EHC 16. Thereafter, when the energization time period TON has elapsed, the alternator output voltage VALT is lowered to ordinary output voltage VCHG (e.g. 14.5 volts) and the changeover switch 23 is switched to the terminal 23b side at a step S8.

The preconditions determined at the step S1 in FIG. 3 may be satisfied when the ignition switch is turned on and at the same time the engine coolant temperature TW and/or the catalyzer temperature TCAT is below a predetermined value.

FIGS. 7A to 7I collectively form a timing chart showing the relationship between operations of essential component parts and changes in control parameter values. When the ignition switch is turned on at a time point t0 (FIG. 7A), the ECU 5 sets regulator control voltage VC to a predetermined value VC1 for ordinary operation of the engine (FIG. 7F), and sets the alternator generation mode to a mode 1 (FIG. 7H). When a starter of the engine is started at a time point t1 at which a predetermined time period TD (time period required for turning a starter key, e.g. approximately 0.1 sec) has elapsed from the time point t0 (FIG. 7B), rotation of the engine is started (FIG. 7C), and then the alternator output voltage VALT increases to the battery-charging voltage VCHG with an increase in the engine rotational speed NE (FIG. 7G).

When the engine rotational speed NE has reached the predetermined value NEK for determining complete explosion of the engine at a time point t2 (FIG. 7C), the ECU 5 determines that the engine has been brought into a complete explosion state (FIG. 7C), and delivers a changeover control signal to the switch 23 to switch the same from the terminal 23b side to the terminal 23c side (FIG. 7E). Then, the regulator control voltage VC is set to EHC control voltage VC2 such that the alternator output voltage VALT becomes equal to the VEHC value determined at the step S5 in FIG. 3, at a time point t3 after the lapse of a predetermined time period ΔT required for completion of switching of the switch 23 (time period from the time the changeover control signal is generated to the time switching of the switch is actually completed, e.g. approximately 0.25 sec) from the time point t2 (FIG. 7F), whereby the alternator generation mode is shifted to a mode 2 (FIG. 7H). Thus, the alternator output voltage VALT is increased to the value VEHC (FIG. 7G), whereby the temperature of the EHC 16 starts to increase (FIG. 7I). The EHC control voltage VC2 is controlled in a feedback manner such that the detected voltage Supplied to the EHC 16 (voltage on the connecting line 30 in FIG. 2) becomes equal to the determined VEHC value.

Then, at a time point t4 at which the time period TON determined at the step S3 in FIG. 3 has elapsed, the regulator control voltage VC is returned to the VCHG value (FIG. 7F), whereby the generation mode is returned to the mode 1 (FIG. 7H). Thus, the alternator output voltage VALT becomes equal to the ordinary battery-charging voltage VCHG (FIG. 7G). The ECU 5 generates the changeover control signal to the switch 23 to switch the same from the terminal 23c side to the terminal 23b side at a time point t5 after the lapse of the time period ΔT from the time point t4, followed by terminating the electric power supply control carried out at the start of the engine (FIG. 7E).

According to the present embodiment, the motor 27 of the air pump 15 is operated in synchronism with operation of the EHC 16.

Figures 9A, 9B:
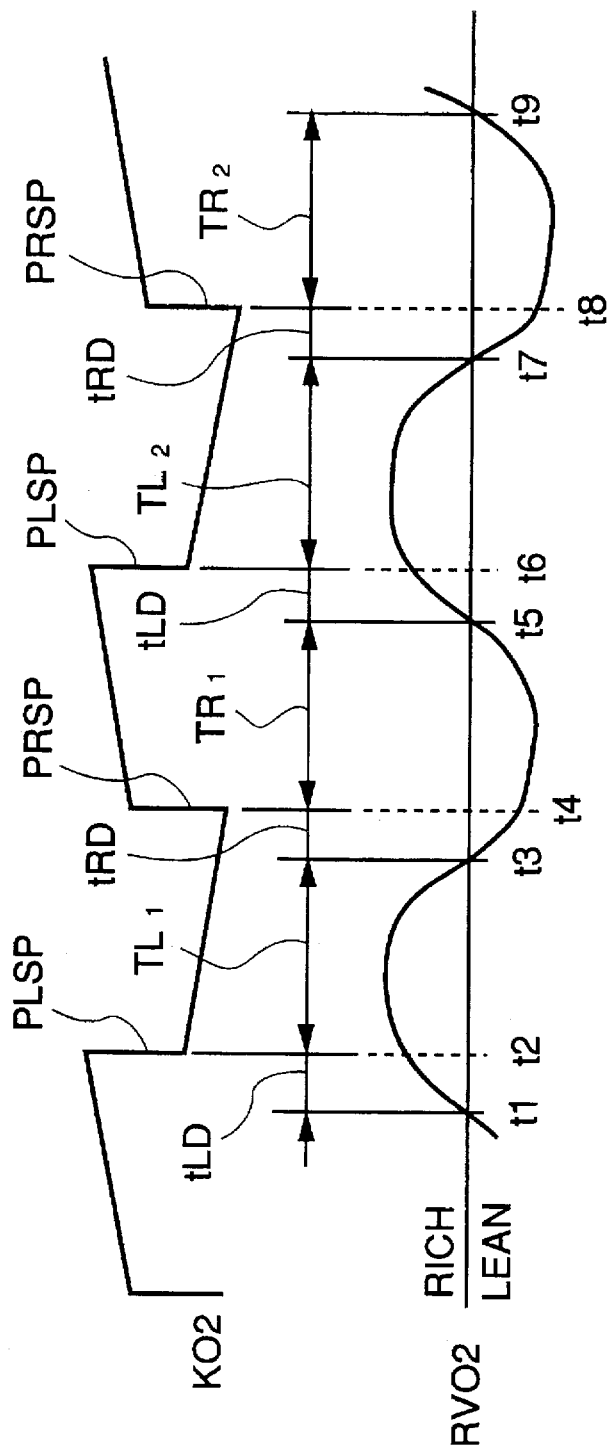

A calculation of the parameter TCHK representative of the deterioration degree of the EHC 16 is carried out as follows: As shown in FIG. 9, during execution of air-fuel ratio feedback control in which the correction coefficient KO2 is calculated based only on the output RVO2 from the downstream O2 sensor 20R, calculations are made of a time period TL from a time point a special P term PLSP for skipping the KO2 value in the decreasing direction is generated to a time point the O2 sensor output RVO2 is inverted, and a time period TR from a time point a special P term PRSP for skipping the KO2 value in the increasing direction is generated to a time point the O2 sensor output RVO2 is inverted. The calculation of the TCHK value is carried out based on the thus obtained time periods TL and TR.

Figure 8:
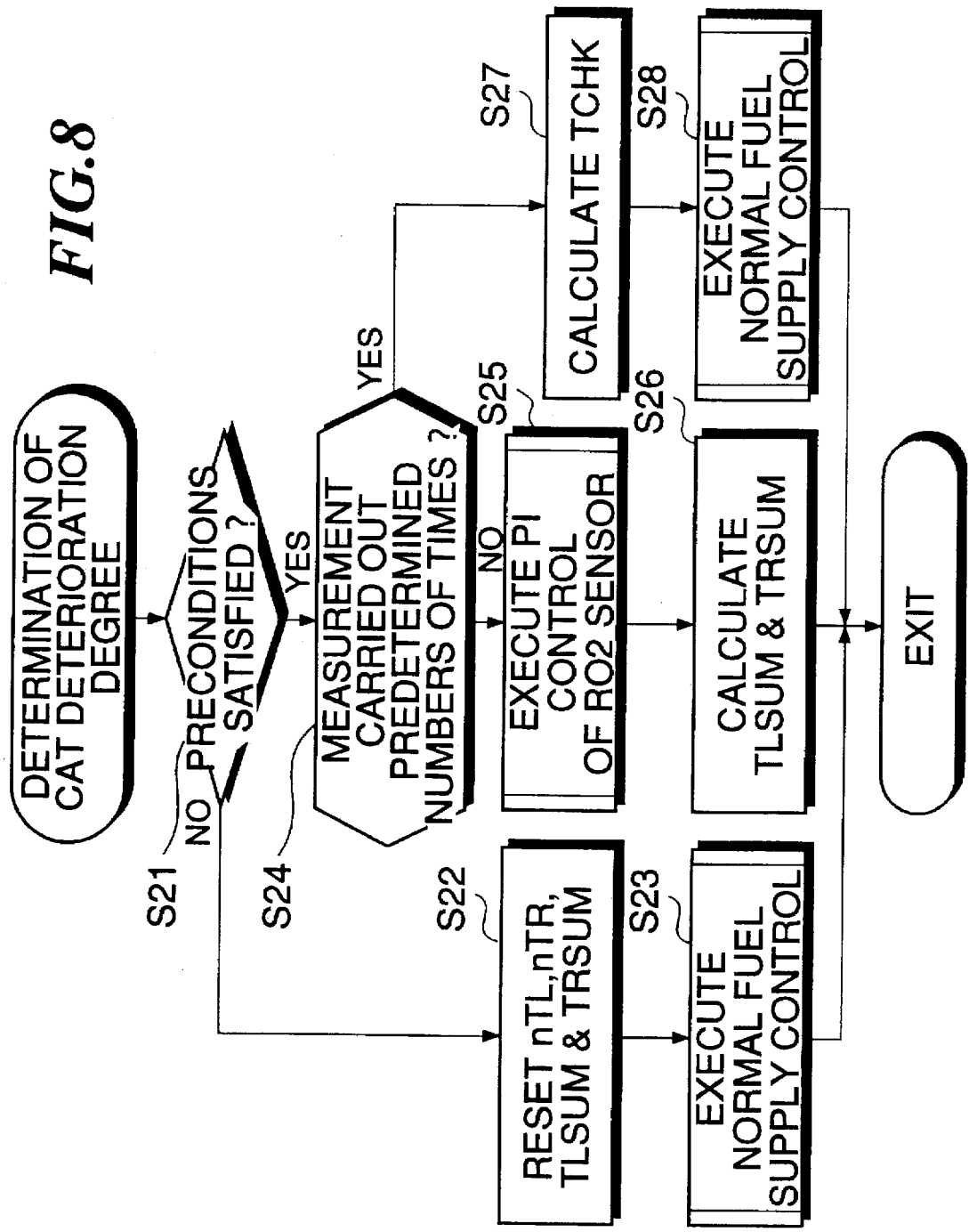
FIG. 8 is a flowchart showing a program for determining the deterioration degree of the catalyzer.

FIG. 8 shows a program for calculating the deterioration degree of the EHC 16. At a step S21 in the figure, it is determined whether or not preconditions for carrying out the calculation of the deterioration degree are satisfied. The preconditions are satisfied when certain engine operating parameters, such as engine rotational speed NE, and intake pipe absolute pressure PBA, are within respective predetermined ranges while the engine is operating in a steady condition.

If the preconditions are not satisfied, the program proceeds to a step S22, wherein cumulative values TLSUM and TRSUM of the respective time periods TL and TR, and numbers of times of calculation nTL and nTR thereof are reset to zero, and then normal fuel supply control is carried out at a step S23. In the normal fuel supply control, when the engine is in the air-fuel ratio feedback control region, the correction coefficient KO2 is calculated by feedback control based on the outputs from the O2 sensors 20F and 20R, while the KO2 value is set to a predetermined value corresponding to the engine operating condition when the engine is in each of the open loop control regions.

If the preconditions are satisfied, the program proceeds to a step S24, wherein it is determined whether or not the measurements of the TL and TR values have been carried out predetermined numbers of times, respectively. In the first loop of execution of the program, the answer becomes negative (NO), and therefore the program proceeds to a step S25, wherein PI term (proportional integral term) control based only on the downstream O2 sensor output RVO2 is executed, and the TL and TR values are measured to calculate the respective cumulative values TLSUM and TRSUM thereof at a step S26.

Specifically, as shown in FIG. 9, at a time point t2 a predetermined time period tLD has elapsed after a time point t1 a lean-to-rich inversion of the downstream O2 sensor output RVO2 occurred, the KO2 value is skipped in the decreasing direction using the leaning special P term PLSP, and then I term control is executed by progressively decreasing the KO2 value until a time point t4 a predetermined time period tRD has elapsed after a time point t3 a rich-to-lean inversion of the sensor output RVO2 occurred. The time period from the time point t2 to the time point t3 is measured as a TL value ($TL_1$). Next, at the time point t4, the KO2 value is skipped in the increasing direction by the use of the enriching special P term PRSP, and then I term control is executed by progressively increasing the KO2 value until a time point t6 a predetermined time period tLD has elapsed after a time point t5 a lean-to-rich inversion of the sensor output RVO2 occurred. The time period from the time point t4 to the time point t5 is measured as a TR value ($TR_1$). Thereafter, time periods $TL_2$, $TR_2$, . . . are successively measured in the same manner as above, followed by calculating cumulative values TLSUM and TRSUM of the measured TL and TR values.

If the answer to the question at the step S24 is affirmative (YES), i.e. if the measurements have been carried out the predetermined numbers of times, respectively, the determination time period TCHK is calculated by the use of the following equation (2) at a step S27:

$$TCHK=(TLSUM/nTL+TRSUM/nTR)/2 \qquad (2)$$

Thereafter, the normal fuel supply control is carried out at a step S28, similarly to the step S23.

The average value TCHK of the time periods TL and TR and the purification rate of the catalyzer (CAT conversion rate) are in the relationship as shown in FIG. 10, wherein the average value TCHK decreases as the purification rate decreases, i.e. the catalyzer is deteriorated to a larger degree. Therefore, in the figure, within a range where the TCHK value decreases as the purification rate decreases, the TCHK value represents the deterioration degree of the catalyzer (degradation degree of the purification rate). The purification rate of the catalyzer depends on the oxygen storage capacity (O2 storage capacity) of the catalyzer so that a decrease in the determination time period TCHK means a degradation in the O2 storage capacity. Thus, by calculating the determination time period TCHK, the deterioration degree of the catalyzer can be accurately obtained.

Although in the above described embodiment, the voltage supplied to the EHC 16 and the energization time period of the same are both determined according to the engine coolant temperature TW and the intake air temperature TA, this is not limitative. Alternatively, the energization time period may be set to a fixed value. Further, in place of either the engine coolant temperature TW or the intake air temperature TA, the catalyzer temperature TCAT detected by the catalyst temperature sensor 19 may be employed for determination of the voltage VECH and the energization time period TON. Still further, the voltage VECH and the energization time period TON may be determined according to one or two of the engine coolant temperature TW, the intake air temperature TA, and the catalyzer temperature TCAT. Moreover, in place of the catalyzer temperature TCAT, a parameter representative of the temperature of the exhaust system such as the temperature of exhaust gases may be employed.

As described above, according to the invention, electric power is supplied from an alternator to an electrically-heated catalyzer arranged in the exhaust system of an internal combustion engine, and voltage generated by the alternator is controlled according to a degree of aging of the catalyzer. As a result, the temperature of the electrically-heated catalyzer can be accurately controlled according to the degree of aging of the catalyzer, thereby preventing excessive elevation of the temperature of the catalyzer when it is fresh, while preventing degradation of exhaust emission characteristics of the engine when the catalyzer is aged.

What is claimed is:

1. An exhaust gas-purifying system for an internal combustion engine having an exhaust system, comprising:

an alternator driven by said engine, for generating electric power;

regulator means for controlling voltage generated by said alternator;

an electrically-heated catalyzer arranged in said exhaust system of said engine, said catalyzer being connected to said alternator to be electrically heated by said electric power generated by said alternator;

aging degree-detecting means for detecting a degree of aging of said electrically-heated catalyzer; and regulator control means for controlling said regulator means to control said voltage generated by said alternator and supplied to said electrically-heated catalyzer, according to said degree of aging of said electrically-heated catalyzer detected by said aging degree-detecting means.

2. An exhaust gas-purifying system as claimed in claim 1, wherein said aging degree-detecting means detects a value of a parameter representative of an oxygen storage capacity of said electrically-heated catalyzer, said regulator control means controlling said voltage generated by said alternator and supplied to said electrically-heated catalyzer according to said value of said parameter detected by said aging degree-detecting means.

3. An exhaust gas-purifying system as claimed in claim 2, including oxygen concentration-detecting means arranged in said exhaust gas of said engine downstream of said electrically-heated catalyzer, for detecting concentration of oxygen in exhaust gases from said engine, and wherein said aging degree-detecting means detects an inversion time period of an output from said oxygen concentration-detecting means as said value of said parameter representative of said oxygen storage capacity of said electrically-heated catalyzer.

4. An exhaust gas-purifying system as claimed in claim 1, wherein said aging degree-detecting means detects said degree of aging of said electrically-heated catalyzer, based on a traveling distance of an automotive vehicle in which said engine is installed.

5. An exhaust gas-purifying system as claimed in claim 1, wherein said aging degree-detecting means detects said degree of aging of said electrically-heated catalyzer, based on a number of times of energization of said electrically-heated catalyzer after start of use thereof.

6. An exhaust gas-purifying system as claimed in claim 1, including operating condition-detecting means for detecting operating conditions of said engine, and wherein said regulator control means according to said operating conditions of said engine detected by said operating conditions of said engine as well as said degree of aging of said electrically-heated catalyzer detected by said aging degree-detecting means.

7. An exhaust gas-purifying system as claimed in claim 6, wherein said regulator control means further controls a time period over which said voltage generated by said alternator is supplied to said electrically-heated catalyzer, according to said operating conditions of said engine detected by said operating condition-detecting means.

8. An exhaust gas-purifying system as claimed in claim 6 or 7, wherein said operating condition-detecting means detects at least one of temperature of said engine, temperature of intake air supplied to said engine, and temperature of said exhaust system.

* * * * *